May 24, 1955 R. L. DAVIS 2,708,966
INERTIA-OPERATED SAFETY EQUIPMENT
Filed Oct. 20, 1951 2 Sheets-Sheet 1

INVENTOR
Robert L. Davis
BY John S. Braddock
ATTORNEY

May 24, 1955  R. L. DAVIS  2,708,966
INERTIA-OPERATED SAFETY EQUIPMENT
Filed Oct. 20, 1951  2 Sheets-Sheet 2
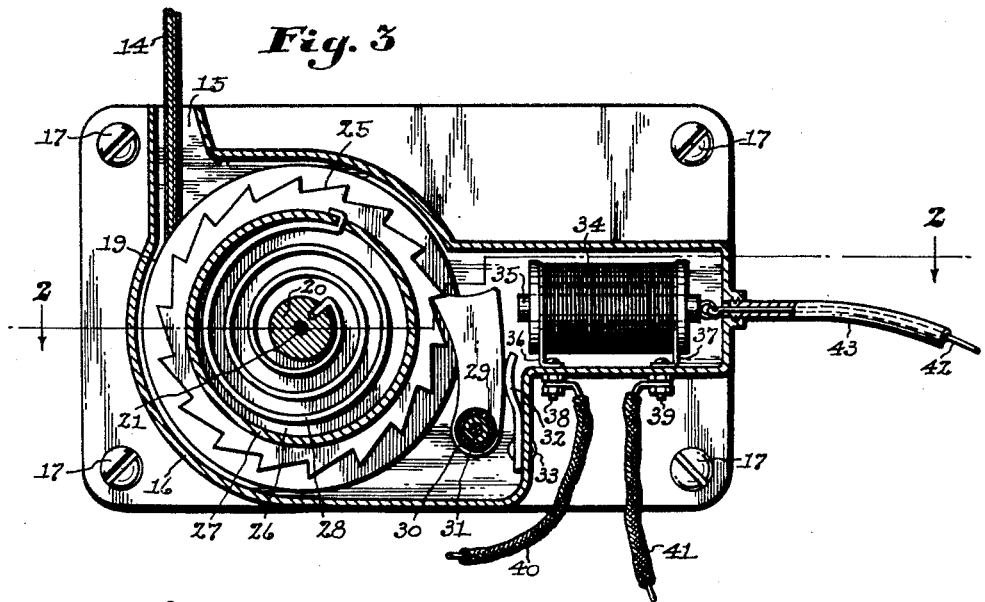
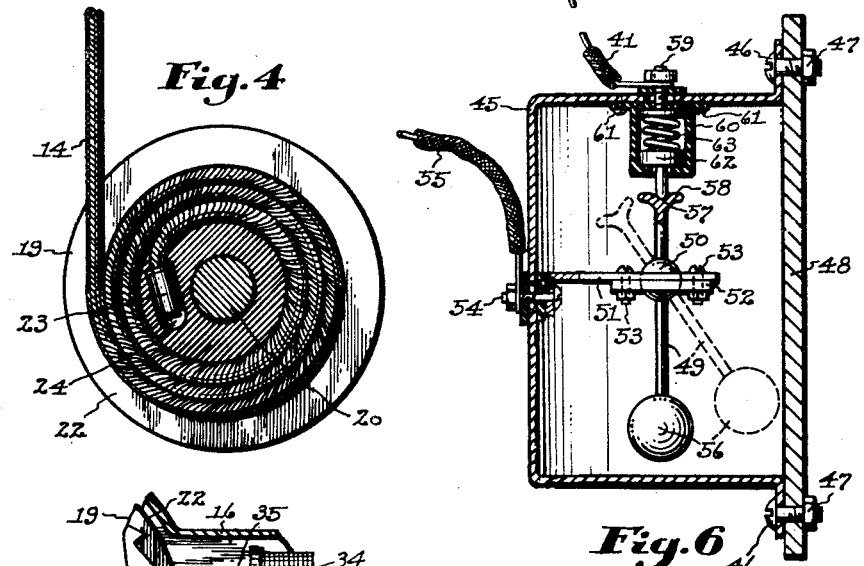
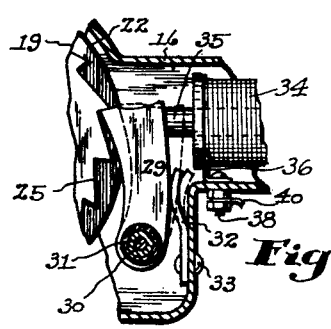
INVENTOR
Robert L. Davis
BY John S. Braddock
ATTORNEY United States Patent Office 2,708,966
Patented May 24, 1955

2,708,966

INERTIA-OPERATED SAFETY EQUIPMENT

Robert L. Davis, Grand Rapids, Mich., assignor to American Seating Company, Grand Rapids, Mich., a corporation of New Jersey Application October 20, 1951, Serial No. 252,218

4 Claims. (Cl. 155—189)

The present invention relates to inertia-operated safety equipment for use on aircraft or other vehicles.

The primary objects of the invention are to provide improved devices for securing occupants of moving vehicles in rearward positions in their seats in the event of sudden deceleration of such vehicles as in a crash, thus to prevent the occupants' being thrown forwardly against appurtenances of the vehicle and being injured or killed; to provide such improved equipment which embodies a combination of mechanical, electrical and inertia forces to accomplish the desired results in a positive and efficient manner; to provide such equipment which is inertia-operable multidirectionally, that is to say, equipment which will operate to lock an occupant in his chair in the event of a crash regardless of the direction of impact of the vehicle with some external object, including the earth in the case of aircraft; in particular, to provide improved means for taking up the cable on an airplane pilot's safety shoulder harness and to lock the cable against paying out in the event of a crash; and in general, to provide improved electrically controlled, inertia-responsive equipment for effecting specified mechanical results in any instances where the desirability of such equipment is indicated.

An illustrative embodiment of the invention is shown in the accompanying drawings, wherein:

Figure 3 is a view of the cable takeup unit, partly in rear elevation and partly in vertical section taken on line 3—3 of Figure 2;

Figure 4 is a vertical sectional view, taken on line 4—4 of Figure 2, of a rotatably mounted cable takeup drum which forms part of the unit shown in Figures 2 and 3;

Figure 5 is a fragmentary view of certain parts of the cable takeup unit in different moved positions from their positions shown in Figure 3; and Figure 6 is a sectional view of the inertia switch unit of the equipment, the section being taken in a fore-and-aft vertical plane passed through the vertical axis of the switch unit.

Figure 1:
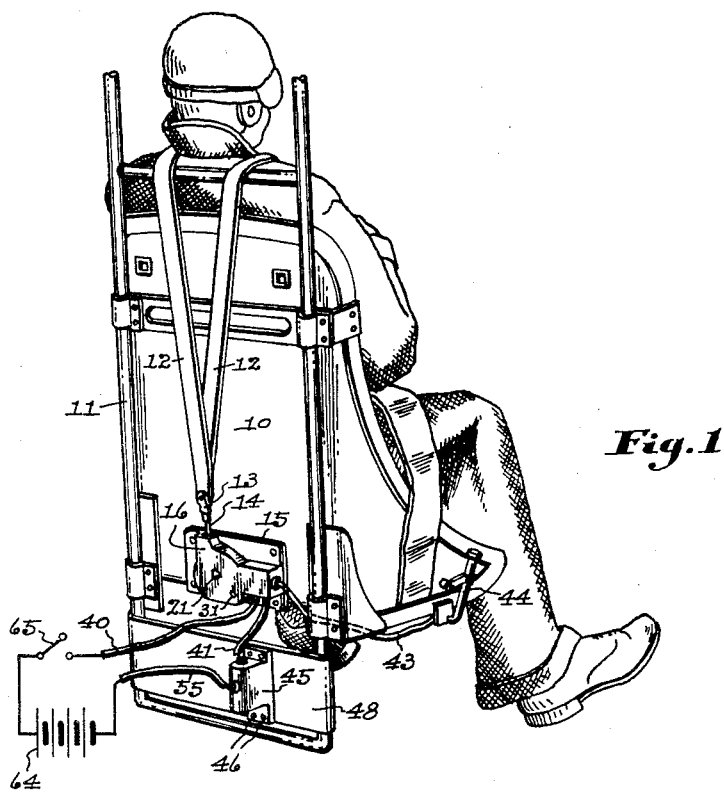
Figure 1 is a rear perspective view of an aircraft pilot's chair with the pilot seated therein, the new safety equipment being shown mounted on the chair and the source of electric current for operating the equipment being indicated diagrammatically in this view.

Referring now in detail to these drawings, Figure 1 shows a conventional airplane pilot's chair 10 mounted upon a tubular metal frame 11 fixedly secured in position within the airplane (not shown). Associated with the chair is a safety shoulder harness comprising shoulder straps 12 secured in front to the chair, then passed rearwardly over the chair occupant's shoulders and joined together in the rear of the chair. At the junction of these straps there is secured a clevis 13 from which depends a cable 14.

Figure 2:
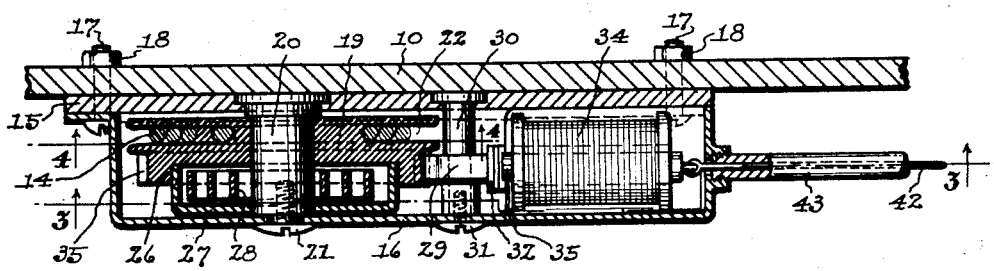
Figure 2 is a horizontal sectional view of the cable takeup unit of the equipment, the section being taken on line 2—2 of Figure 3.

The cable takeup unit of the new equipment is here shown mounted on a base plate 15 having a housing or cover 16 secured thereto, and both the cover 16 and the base plate 15 are secured to the back of the chair 10 by means of bolts 17 passing therethrough and provided with nuts 18 (see Figure 2). A drum 19 is rotatably mounted within the housing or cover 16 on a spindle 20 which projects rearwardly from the base plate 15 and which has its rearward end secured to the cover 16 by means of a screw 21 threaded therein. The forward part of the drum 19 has a cable-receiving spool 22 in its periphery, and the lower part of the cable 14 is taken up on this spool. The innermost end of the cable 14 has a fitting 23 seated in a recess 24 in the drum 19 and this end of the cable is thus made secure to the drum (see Figure 4).

The rearward part of the drum 19 is provided with a ratchet wheel 25 on its periphery, said ratchet wheel being here shown formed integrally with the drum. In the rear surface of the drum there is provided a recess 26 into which is fitted a cup-shaped housing 27 which houses a coil spring 28 the outer end of which is secured to said housing 27 (see Figure 3) and the inner end of which spring 28 is secured to the spindle 20. The coil spring 28 normally urges the drum 19 in a direction-counterclockwise, as viewed in Figure 3—for winding the cable 14 thereon to tighten the shoulder harness.

A pawl 29 is turnably mounted on a pin 30 extending from the base plate 15 rearwardly to the cover 16 and secured to the cover by means of a screw 31 threaded in the end of the pin 30. Spring means comprising a leaf spring 32 secured to the cover 16 by means of a rivet 33 normally press the pawl toward a position of engagement with the teeth of the ratchet wheel 25 on the drum (see Figure 3), in which position of the pawl the drum is prevented from rotating in a direction for unwinding the reel to relax the harness but is free to ratchet past the pawl in a direction for winding the cable thereon to tighten the harness. Thus any slack in the harness and its cable 14 is taken up at all times.

An electromagnet 34, here shown as a solenoid having a longitudinally movable core 35, is mounted within the housing or cover 16 on brackets 36, 37 (see Figure 3) which serve as terminals for the coil and which are mounted on the cover 16 by means of terminal bolts 38, 39 to which are connected electric lead wires 40, 41 respectively. The brackets 36, 37 and terminal bolts 38, 39 are desirably insulated from the cover 16. One end of the core 35 of the solenoid—the left end as viewed in Figure 3— is adapted when the coil is energized to maintain the pawl in a position of disengagement from the ratchet wheel 25 on drum 19, against the force of the spring 32. To the other end of the core 35 of the solenoid is connected one end of a Bowden control wire 42 which extends through the control's flexible tube 43 to a manual control lever 44 mounted on the side of the chair 10 within easy access of the chair occupant. The operation of these parts is described hereinafter.

The inertia switch unit of the equipment (see Figures 1 and 6) is mounted in a housing 45 secured as by means of bolts 46 having nuts 47 to a plate 48 mounted in any suitable manner on the lower part of the chair's supporting frame 11. As here shown, the switch unit comprises a pendulum 49 having a medial ball portion 50 universally movable in a ball socket formed between a bracket 51 and a plate 52 secured to the bracket by means of screws or bolts 53, the bracket 51 being secured to a side wall of the housing 45 by means of a terminal bolt 54 which is insulated from the housing 45 and which has an electric lead wire 55 connected thereto. The pendulum 49 has a weight 56 at its lower end, and has a socket 57 in its upper end surrounded by an outwardly and downwardly curved cam surface 58.

The lead wire 41 extends from its terminal connection at 39 with the solenoid 34 hereinbefore described, to a terminal bolt 59 mounted in the upper wall of the switch housing 45 and insulated therefrom. An insulation cylinder 60 is mounted as by means of screws 61 to the underside of the upper wall of the switch housing, beneath the terminal bolt 59 and directly above the pendulum 49. A plunger 62 is vertically slidably disposed in the insulation cylinder 60 and has a reduced lower portion which depends through a central opening in the bottom of the cylinder 60 and normally bears in the socket 57 in the upper end of the pendulum 49. A compression spring 63 is interposed between the enlarged lower end of the cylinder 60 and the upper end of the plunger 62 for normally urging the plunger downwardly.

The lead wires 40 and 55 of the equipment are connected to a suitable source of electricity, such as the storage battery 64 of the vehicle, as illustrated diagrammatically in Figure 1. If desired, a manually operable switch 65 may be interposed in one of the leads and is here shown diagrammatically in the lead 40.

*Operation*

When the switch 65 is open as shown in Figure 1, the solenoid 34 is deenergized and the parts of the device assume their positions illustrated in Figure 3, wherein leaf spring 32 urges the pawl 29 into engagement with the ratchet wheel 25 on drum 19. In this position of the parts, it will be seen that the chair occupant will be locked in the chair in the rearwardmost position he may assume, because the drum takes up any slack in the cable but will not pay out because of the engagement of pawl 29 with the teeth of ratchet wheel 25. When the vehicle is in motion, however, it is desirable that the chair occupant have complete freedom of movement except in the event of sudden deceleration of the vehicle as in a crash. During the travel of the vehicle, therefore, the manual switch 65 remains closed at all times. This completes an electric circuit from the battery 64 through switch 65, lead wire 40, solenoid 34, lead wire 41, spring 63, pendulum 49, bracket 51, and lead wire 55 back to battery 64. When the circuit is thus closed, the chair occupant first moves the manual control lever 44 rearwardly. This moves core 35 of the solenoid into contact with pawl 29 as shown in full lines in Figure 5. The manual control lever 44 is then moved forwardly either manually or by suitable spring means (not shown) and the core 35 of the solenoid, being magnetized, moves pawl 29 to a position of disengagement from the ratchet wheel 25 on drum 19 as indicated in dotted lines in Figure 5. The equipment is now set so that the chair occupant has complete freedom of movement but will, by inertia force, be automatically locked in his rearwardmost position in event of a crash. If such crash occurs, pendulum 49 will be swung by the inertia of its weight 56, regardless of the direction of impact, to a tilted position wherein contact is broken between the upper end of the pendulum and the lower end of plunger 62. One such tilted position of the pendulum 49 is indicated in dotted lines in Figure 6. When the electric circuit above described is thus interrupted, even though only momentarily, the solenoid 34 is de-energized and the leaf spring 32 presses pawl 29 into its position of engagement with the ratchet wheel 25 on drum 19, thus locking the drum against rotation in a direction for unwinding the cable to relax the shoulder harness. The chair occupant is thus securely held in his rearwardmost position and is prevented from falling forward and being injured. If the pendulum returns to its normal upright position, the electric circuit is re-established, but the electromagnet 34 is not powerful enough to draw the pawl 29 against the force of spring 32 the distance necessary to disengage the pawl from ratchet wheel 25, and the equipment must again be manually set for inertia operation as hereinbefore described.

It will thus be seen that the invention provides a novel and efficient inertia-operated safety device, and while but one specific embodiment of the invention has been herein shown and described, it will be understood that numerous details may be altered or omitted without departing from the spirit of the invention as the same is defined by the following claims.

I claim:

1. Safety equipment for use on a moving vehicle, comprising, in combination: a chair in the vehicle; a harness for the chair occupant associated with the chair; a support mounted in the vehicle; a drum rotatably mounted on said support; means connecting the harness and the drum whereby rotation of the drum in one direction tightens the harness and opposite rotation of the drum relaxes the harness; means normally urging the drum in a direction for tightening the harness; locking means on said support associated with the drum and adapted to lock the drum against rotation in a direction for relaxing the harness; spring means normally urging said locking means toward a position of locking engagement with the drum; electromagnetic means included in an electric circuit which when closed energizes said electromagnetic means for releasably maintaining said locking means out of locking engagement with the drum; and an inertia-operable switch mounted on the vehicle and included in said electric circuit, said switch being responsive to sudden deceleration of the vehicle to interrupt said electric circuit thus to de-energize said electromagnetic means and permit said spring means to move the locking means to its position of locking engagement with said drum.

2. Safety equipment for use on a moving vehicle, comprising, in combination: a chair in the vehicle; a harness for the chair occupant associated with the chair; a support mounted in the vehicle; a drum rotatably mounted on said support; a cable connected to the harness and the drum whereby rotation of the drum in one direction winds the cable thereon to tighten the harness and opposite rotation of the drum unwinds the cable to relax the harness; means normally urging the drum in a direction for winding the cable thereon; locking means on said support associated with the drum and adapted to lock the drum against rotation in a direction for unwinding the cable; spring means normally urging said locking means toward a position of locking engagement with the drum; electromagnetic means included in an electric circuit which when closed energizes said electromagnetic means for releasably maintaining said locking means out of locking engagement with the drum; and an inertia-operable switch mounted on the vehicle and included in said electric circuit, said switch being responsive to sudden deceleration of the vehicle to interrupt said electric circuit thus to de-energize said electromagnetic means and permit said spring means to move the locking means to its position of locking engagement with said drum.

3. Safety equipment for use on a moving vehicle, comprising, in combination: a chair in the vehicle; a harness for the chair occupant associated with the chair; a support mounted in the vehicle; a drum rotatably mounted on said support and provided with ratchet teeth thereon; means connecting the harness and the drum whereby rotation of the drum in one direction tightens the harness and opposite rotation of the drum relaxes the harness; means normally urging the drum in a direction for tightening the harness; a pawl on said support movable to a position of engagement with the ratchet teeth on the drum to prevent rotation of the drum in a direction for relaxing the harness, and to a position of disengagement from said ratchet teeth; spring means normally urging the pawl towards its position of engagement with said ratchet teeth; an electromagnet on said support adapted when energized to maintain said pawl in its position of disengagement from said ratchet teeth, said electromagnet being included in a manually closable electric circuit for being thus energized; and an inertia-operable switch mounted on the vehicle and included in said electric circuit, said switch being responsive to sudden deceleration of the vehicle to interrupt said electric circuit thus to de-energize said electromagnet and permit said spring means to move the pawl to its position of engagement with said ratchet teeth.

4. Safety equipment for use on a moving vehicle, comprising, in combination: a chair in the vehicle; a harness for the chair occupant associated with the chair; a support mounted in the vehicle; a drum rotatably mounted on said support and provided with a ratchet wheel circumscribing a portion of its periphery and with a cable-receiving spool in another portion of its periphery; a cable connected to the harness and to the drum whereby rotation of the drum in one direction winds the cable on the spool to tighten the harness and opposite rotation of the drum unwinds the cable to relax the harness; a coil spring connected to the support and the drum for normally urging the drum in a direction for winding the cable thereon; a pawl on said support movable to a position of engagement with said ratchet wheel to prevent rotation of the drum in a direction for unwinding the cable, and to a position of disengagement from said ratchet wheel; spring means on the support pressing against the pawl to normally urge the pawl toward its position of engagement with the ratchet wheel; an electromagnet on said support adapted when energized to maintain said pawl in its position of disengagement from the ratchet wheel against the force of said spring means, said electromagnet being included in a manually closable electric circuit for being thus energized; and an inertia-operable switch mounted on the vehicle and included in said electric circuit, said switch being responsive to sudden deceleration of the vehicle to interrupt said electric circuit thus to de-energize said electromagnet and permit the pawl to move under the force of said spring means to its position of engagement with the ratchet wheel.

References Cited in the file of this patent

UNITED STATES PATENTS

| | | |
|---|---|---|
| 1,901,554 | DeWilde | Mar. 14, 1933 |
| 2,223,097 | Ehret | Nov. 26, 1940 |
| 2,350,063 | Overby et al. | May 30, 1944 |
| 2,403,653 | Geohegan et al. | July 9, 1946 |
| 2,480,335 | Nordmark | Aug. 30, 1949 |
| 2,535,384 | Batt | Dec. 26, 1950 |
| 2,557,313 | Quilter | June 19, 1951 |
| 2,578,940 | Morris | Dec. 18, 1951 |
| 2,650,655 | Neahr et al. | Sept. 1, 1953 |